US 6,708,162 B1

(12) United States Patent
Morgan et al.

(10) Patent No.: US 6,708,162 B1
(45) Date of Patent: Mar. 16, 2004

(54) METHOD AND SYSTEM FOR UNIFYING SEARCH STRATEGY AND SHARING SEARCH OUTPUT DATA ACROSS MULTIPLE PROGRAM MODULES

(75) Inventors: Bruce Alan Morgan, Bellevue, WA (US); Maria Blees, Redmond, WA (US); David S. Kosbie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/566,838

(22) Filed: May 8, 2000

(51) Int. Cl.[7] .............................................. G06F 17/30
(52) U.S. Cl. ........................................................ 707/3
(58) Field of Search .............................. 707/1–5, 9, 10, 707/100, 102, 164.1, 200, 104.1; 345/700, 733; 709/200–203, 310

(56) References Cited

U.S. PATENT DOCUMENTS

| | | | | |
|---|---|---|---|---|
| 5,036,315 A | * | 7/1991 | Gurley ........................ 345/660 |
| 5,208,910 A | * | 5/1993 | Higgins et al. ............. 345/820 |
| 5,782,296 A | * | 7/1998 | Mehta ........................ 165/268 |
| 5,897,634 A | * | 4/1999 | Attaluri et al. ............... 707/10 |
| 5,923,879 A | * | 7/1999 | Sasmazel et al. ........... 707/102 |
| 5,959,686 A | * | 9/1999 | Jeong ......................... 345/1.3 |
| 6,026,398 A | * | 2/2000 | Brown et al. .................. 704/1 |
| 6,172,675 B1 | * | 1/2001 | Ahmad et al. ............... 345/723 |
| 6,233,571 B1 | * | 5/2001 | Egger et al. .................... 707/2 |
| 6,260,039 B1 | * | 7/2001 | Schneck et al. ................ 707/1 |
| 6,356,437 B1 | * | 3/2002 | Mitchell et al. ............. 342/352 |
| 6,421,683 B1 | * | 7/2002 | Lamburt ...................... 710/33 |
| 6,421,701 B1 | * | 7/2002 | Elnozahy .................... 709/100 |
| 6,427,149 B1 | * | 7/2002 | Rodriguez et al. ............ 707/10 |

* cited by examiner

Primary Examiner—Greta Robinson
Assistant Examiner—Harold E. Dodds, Jr.
(74) Attorney, Agent, or Firm—King & Spalding LLP

(57) ABSTRACT

A search across multiple programs can be conducted, whether or not a particular program is active. After a search is conducted, search results can be displayed from programs that are in use and those that are not currently in use when the search is initiated. Upon selection of a search result, the program supporting the selected result can be launched if it is not already in use and can become the active program. Once the program supporting the selected result becomes active, the search result can be pre-populated within the search engine of the program. Therefore, search strategy across multiple programs is unified while sharing of search output data across multiple programs is facilitated. This sharing of data makes information across multiple separate programs more readily accessible. Also, a consistent user interface for searching across multiple programs is presented. This interface can eliminate the learning of multiple search techniques that are dependent upon a unique search engines of respective programs.

30 Claims, 10 Drawing Sheets

METHOD AND SYSTEM FOR UNIFYING SEARCH STRATEGY AND SHARING SEARCH OUTPUT DATA ACROSS MULTIPLE PROGRAM MODULES

TECHNICAL FIELD

The present invention relates to computer systems that are capable of running multiple programs. More particularly, the present invention relates to computer systems that unify the search strategy and share search output data across multiple program modules.

BACKGROUND OF THE INVENTION

Many application programs sold in the marketplace today have internal search engines that enable searches for specific words or phrases or both. Further, many application programs sold in the marketplace also permit searches to be conducted by searching for information by categories. However, each search engine of a respective application program is typically unique to that specific application program.

For example, an application program designed as an electronic dictionary may have a different search engine relative to another application program that may be designed as an interactive electronic encyclopedia. If the dictionary application program and the encyclopedia application program are installed on a single computer system, separate searches for similar information content would be necessary since the search engine of each application program does not communicate with another respective application program. In such a scenario, search strategies specific to each application program must be learned. Further, results for a search are only displayed when a respective application program is launched or is active.

In addition to the problem of separate and unique search engines, the conventional art typically does not have any mechanism for reducing processing time and conserving valuable dynamic memory resources if a previous search entered into a search engine is replicated. In other words, it is common in searching that search terms will be replicated when it is discovered that more information is related to a first search query compared to that of a second search query. For example, if a search was being conducted on a specific topic, such as fox wildlife preservation in the United States, a number of search terms could be entered into a text application program such as an electronic dictionary. The electronic dictionary would then produce search results unique to its search engine. After trial and error, a unique combination of search terms may yield larger search results compared to other combinations of search terms. If the combination of search terms that yields the highest number of search results is replicated, then the dictionary application program typically must re-execute or perform the search again. Such a re-execution of a previous identical search adds to processing time and consumes valuable dynamic memory resources such as DRAM or RAM.

Accordingly, there is a need in the art for a method and system for unifying search strategy and sharing search output data across multiple application programs that makes information across multiple separate application programs more readily accessible. There is a further need in the art for a method and system for unifying search strategy and sharing search output data such that search results from application programs other than application programs currently in use can be obtained. A further need exists in the art for a method and system for unifying search strategy such that search queries can be executed across an entire set of application programs that can be active or inactive. Further, there is a need in the art for a method and system for unifying search results such that search results can be generated without launching inactive application programs or switching to active application programs that may not have a focus on a display device. Similarly, a further need exists for a unified search strategy across multiple application programs that also provides a consistent user interface for searching and that eliminates the learning of multiple search techniques dependent upon a unique search engine of a respective application program.

SUMMARY OF THE INVENTION

The present invention solves the aforementioned problems by providing a user interface that can search information across separate programs. The user interface can display search results from programs that are not currently in use when a search is initiated. Upon selection of a search result, the program supporting the selected result can be launched if it is not already in use and can become the active program. Once the program supporting the selected result becomes active, the search result can be pre-populated within the program.

Conventional search engines typically limit their searches to a single active application program. Therefore, in addition to launching multiple application programs, the conventional search engines require that the query text of a search be re-typed for each search engine of a particular application program. This, in turn, requires that the user become familiar with the search strategy of each search engine of a particular application program. In contrast, the present invention can substantially eliminate the re-keying of query data while substantially increasing efficiency by providing a single user interface that has uniform search strategy.

The present invention can also increase search engine efficiency by sharing search results between programs without requerying. In other words, if a first search is made in a first program and an identical second search is subsequently attempted in either the first or a second program, the results of the first search will be shared with either the first or second program, the second search need not be executed for this unified search strategy. Such sharing of search results within a program or between separate programs can reduce processing time while conserving valuable memory resources.

DETAILED DESCRIPTION OF EXEMPLARY EMBODIMENTS

Figure 1:
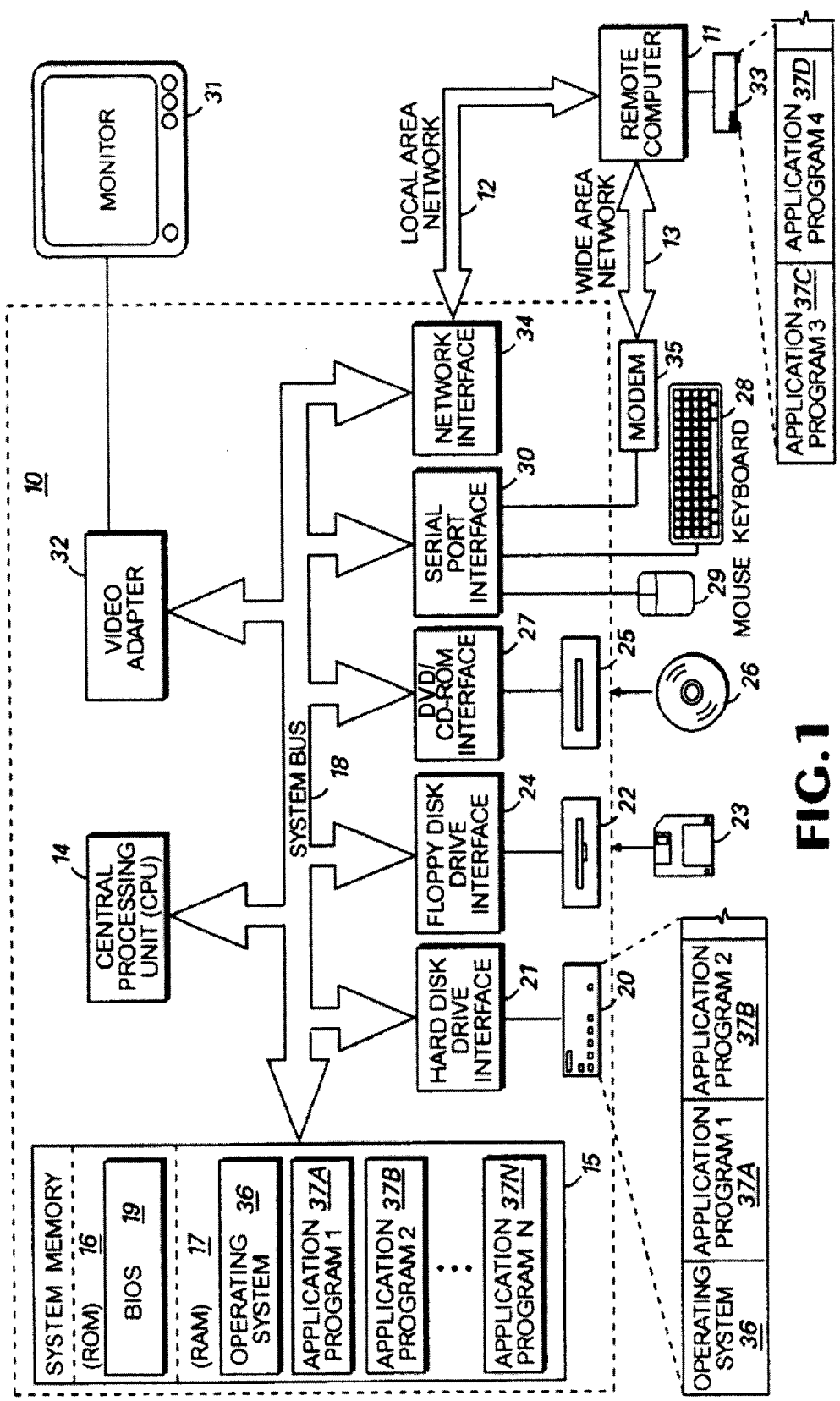
FIG. 1 is a block diagram of a network personal computer that provides the exemplary operating environment for the present invention.

The present invention can search across multiple programs, whether or not a particular program is active. After a search is conducted, search results can be displayed from programs that are in use and those that are not currently in use when the search is initiated. Upon selection of a search result, the program supporting the selected result can be launched if it is not already in use and can become the active program. Once the program supporting the selected result becomes active, the search result can be pre-populated within the search engine of the program. Therefore, the present invention unifies search strategy and facilitates the sharing of search output data across multiple programs. In turn, this sharing of data makes information across multiple separate programs more readily accessible. The present invention provides a consistent user interface for searching and that eliminates the learning of multiple search techniques that are dependent upon a unique search engine of a respective program.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM OR DVD drive 25, which is used to read a CD-ROM OR DVD disk 26, is connected to the system bus 18 via a CD-ROM OR DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM OR DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via computer-readable media. In the preferred computer, the computer-readable media include the local or remote memory storage devices, which may include the local hard disk drive 20, floppy disk 23, CD-ROM OR DVD 26, RAM 17, ROM 16, and the remote memory storage device 33. In the preferred personal computer 10, the local hard disk drive 20 is used to store data and programs, including the operating system and programs.

Figure 2:
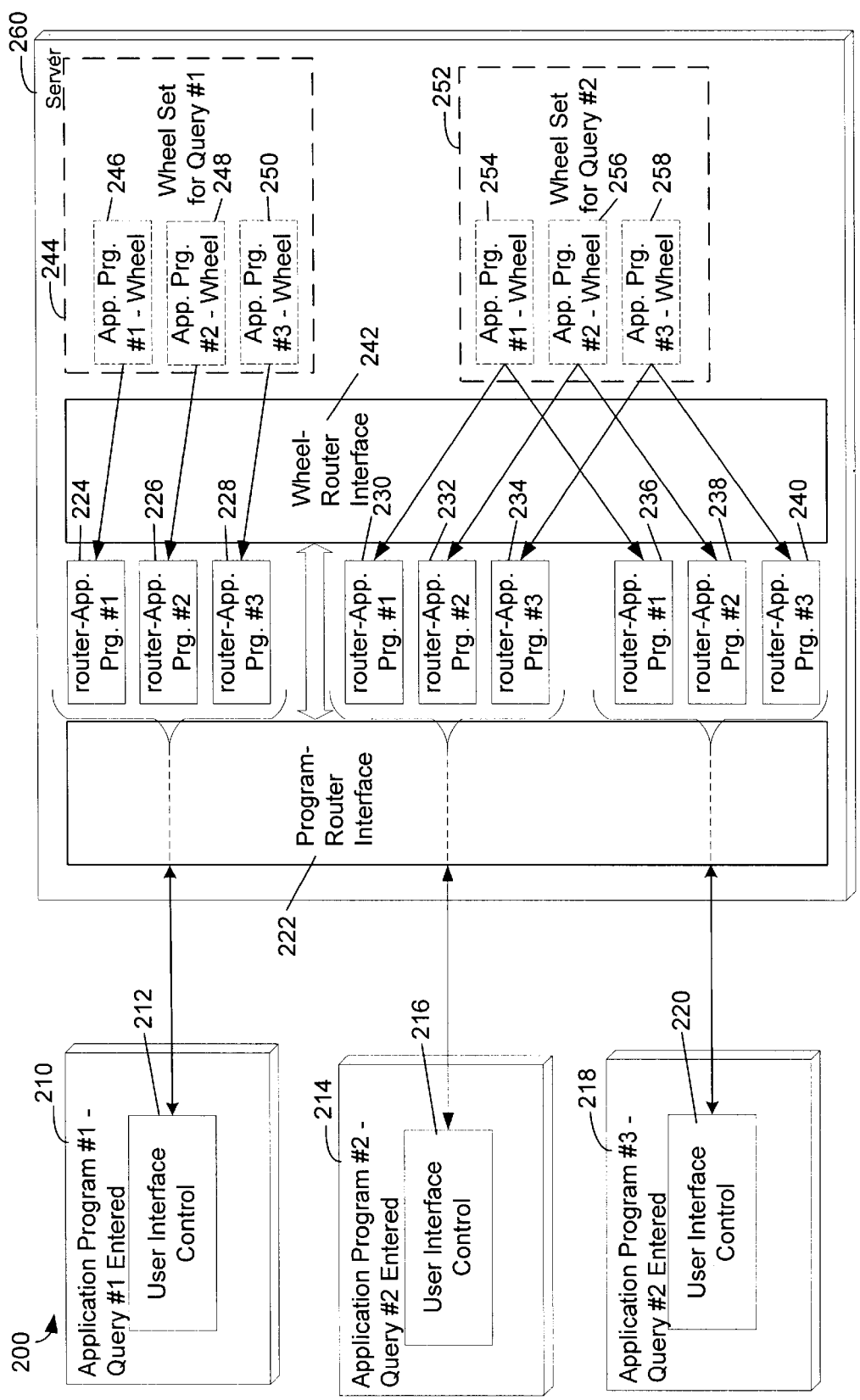
FIG. 2 is a functional block diagram illustrating an exemplary programming architecture for the present invention.

Referring now to FIG. 2, an architecture of the present invention will be described. FIG. 2 illustrates an exemplary system 200 for unifying search strategy an sharing search output data across multiple application programs that includes a first application program 210, a second application program 214, and a third application program 218. The present invention is not limited to the number of application programs illustrated in FIG. 2. Therefore, the search unifying system 200 can include fewer or more application programs than are illustrated in FIG. 2.

To provide a user interface that can locate information across separate application programs in addition to sharing search results between separate application programs, each application program 210, 214, and 218 can host a common user interface control such as the first user interface control 212, the second user interface control 216, and the third user interface control 220. Each user interface control 212, 214, and 218 can be implemented as a Microsoft Foundation Class (MFC)-based activeX control. However, other user interfaces and other programming languages are not beyond the scope of the present invention.

Each user interface control 212, 216, and 220 is connected to data access objects or proxies, referred to as routers. The first user interface control 212 is connected to a first set of routers that include a first router 224, a second router 226, and a third router 228. The number of routers for a set of routers typically corresponds to the number of application programs that are part of the unified search system 200. For example, first router 224 is designed to provide information relating to the first application program 210. On the other hand, the second router 226 is designed to provide information relating to the second application program 214. The third router 228 is designed to provide information relating to the third application program 218. While there is typically a direct correlation between the number of routers and the number of application programs that are part of the unified search system 200, it is noted that an application program may have more than one router assigned to it. The number of routers typically includes the number of application programs that will be searched for data.

Similar to the first user interface control 212, the second user interface control is connected to a second set of routers that includes fourth, fifth, and sixth routers 230, 232, and 234. User interface control 220 is connected to a third set of routers that include a seventh router 236, an eighth router 238, and a ninth router 240. The routers 224–240 direct calls from respective user interface controls 212–220 to appropriate sets 244 and 246 of search result objects. Each user interface control 212–220 typically communicates with each respective router 224–240 via a program router interface 222. The program router interface 222 is usually created by one of the user interface controls 212–220 as an out of process server. The program router interface 222 can be implemented by a server application 260. The server application 260 can also create and manage wheel-router interfaces 242 that link respective routers 224–240 to respective sets 244, 252 of program objects.

The search result objects 246–258 are typically implemented as ATL-based component object model (COM) objects referred to as wheels 246–250, and 254–258. The sets 244 and 252 of wheels 246–250 & 254–258 are also referred to as wheel sets 244, 252. The server application 260 generates each of the wheels 246–250 & 254–258 which is in contrast to the conventional art where wheels are typically created by the user interface control. The server application 260 can be implemented in the exemplary embodiment as a ATL-based COM server application. The present invention is not limited to this open software architecture and the form of the component object model. Other open software architectures are not beyond the scope of the present invention.

Figure 3A:
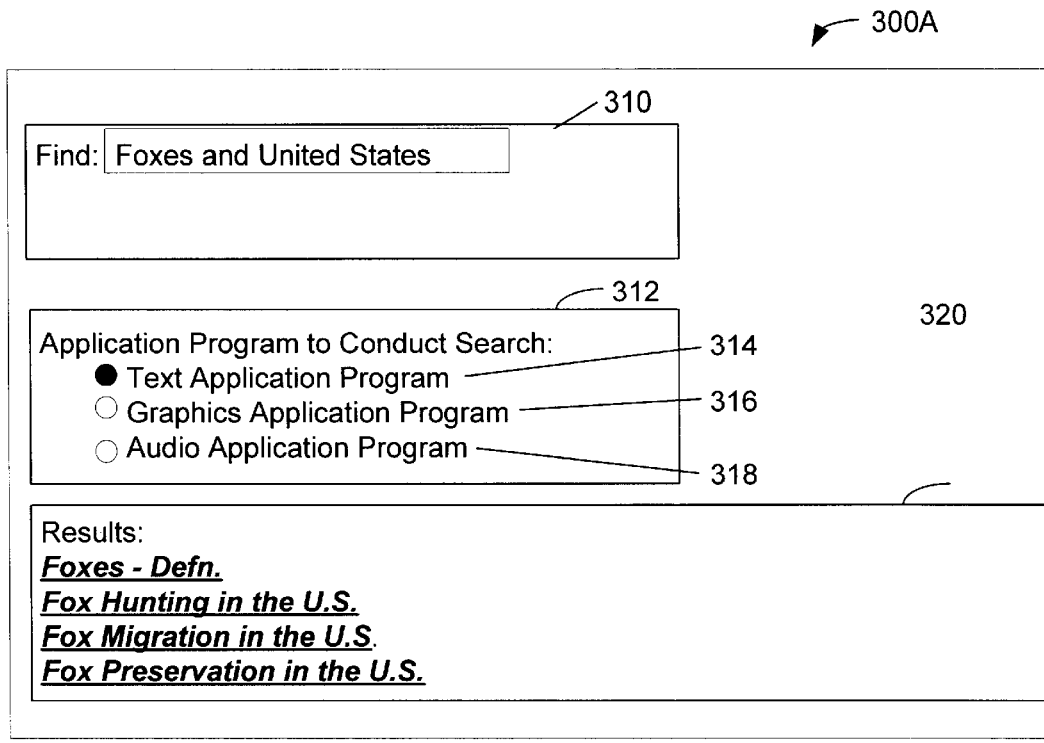
FIG. 3A is an exemplary display screen that illustrates the selection of a text application program as the basis for a search.

Referring now to FIG. 3A, exemplary display screen 300A can be generated when the search engine within an application program is initiated. Search term or query data can be entered into a search engine field 310. In the application program selection field 312, any of the application programs that are part of the unified search system 200 can be selected. In the exemplary display screen 300A, the application programs that are part of the unified search system 200 can include a text application for program 314, a graphics application program 316, and an audio application program 318. In other words, these application programs could be designed as an electronic dictionary, an electronic world atlas and an electronic musical archives, respectively. However, other application programs are not beyond the scope of the present invention. Other application programs can include, but are not limited to, word processing applications, spreadsheet programs, slide presentation programs, and any application program that may contain a search engine to facilitate searching therein. The results field 320 lists the results of a search that was executed in the text application program 314 for the search terms "foxes and United States." Usually, the results field 320 will display overview search output data such as topic categories or header information. However, other result data is not beyond the scope of the present invention. When a topic category or header is selected, more specific data records corresponding to the topic category or header is displayed.

Figure 3B:
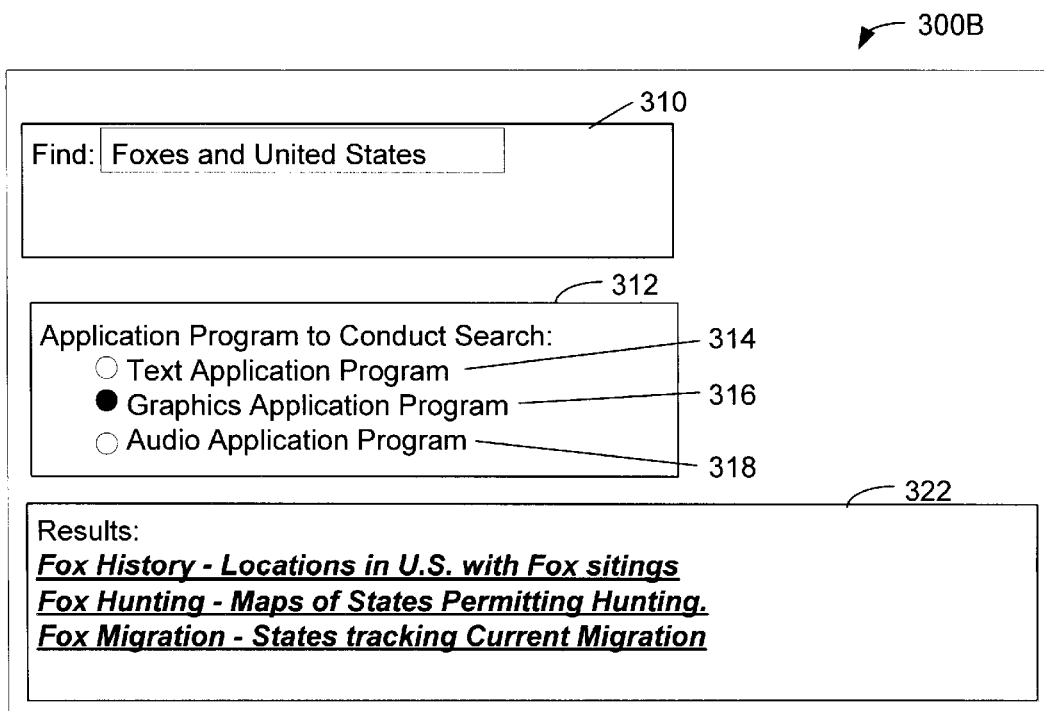
FIG. 3B is an exemplary display screen that illustrates the selection of a graphics application program as the basis for the search executed in FIG. 3A.

FIG. 3B illustrates another exemplary display screen 300B where a graphics application program 316 is selected as the basis for a search. As a result of this selection, different search results are now present in the search result field 322. If the information listed in search results field 322 or the search result field 320 of FIG. 3A is desirable, then the topics listed in the respective result field can be activated in order to generate more specific search results, such as appropriate text or graphics or both.

Figure 3C:
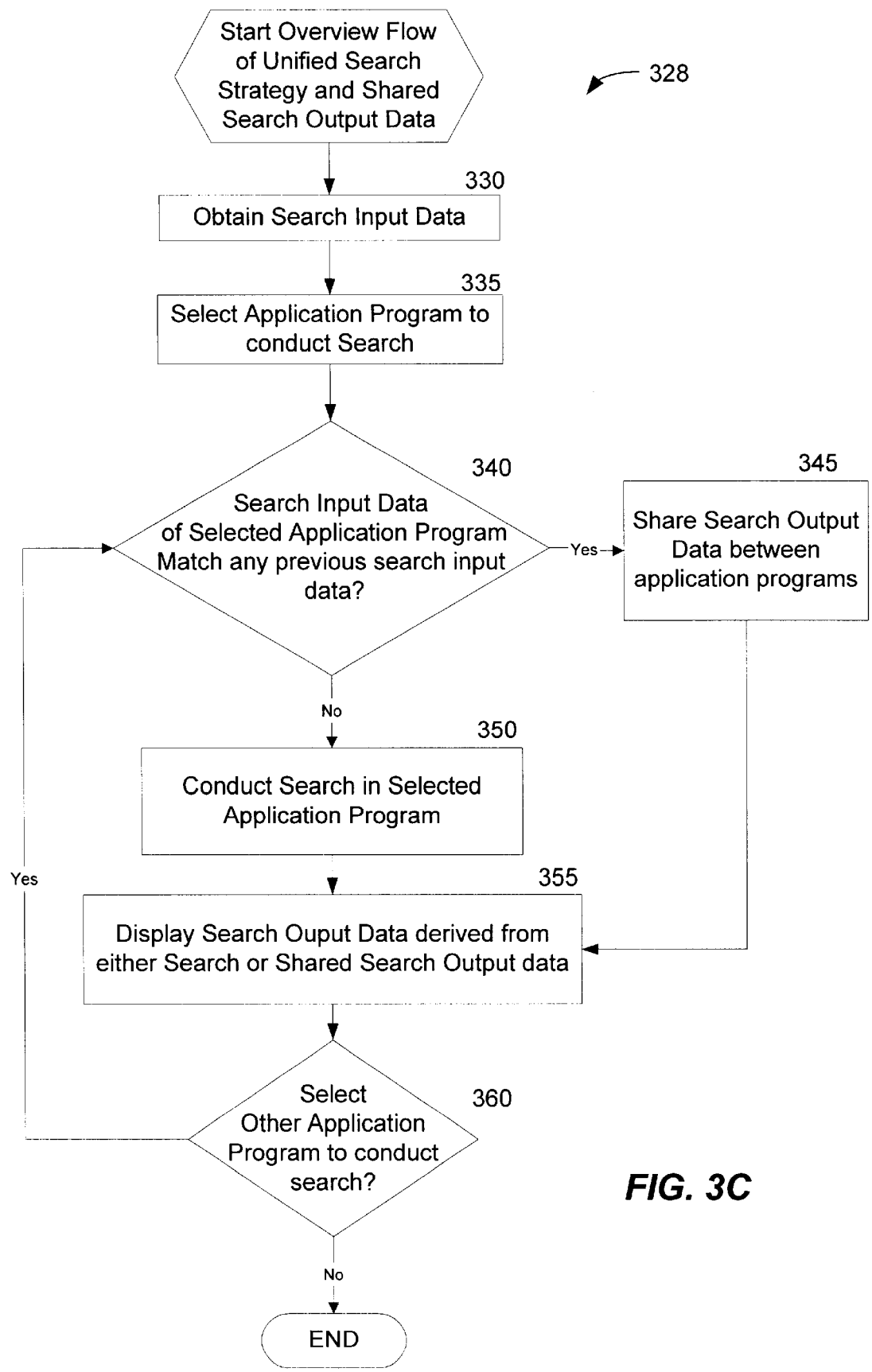
FIG. 3C is a logic flow diagram illustrating an overview of an exemplary process for unifying search strategy and sharing search output results between separate application programs.

FIG. 3C is a exemplary logic flow diagram illustrating an overview of a computer implemented process for unifying search strategy and sharing search output results between separate application programs. FIG. 3C provides an overview of the entire process 328 where step 330 is the first step of the process 328. In step 330, search input data can be obtained such as search terms entered into a search engine field 310 as illustrated in FIG. 3A. Next, an application program such as the text application program 314, graphics application program 316, or audio application program 318 is selected to conduct the search. In decision step 340, it is determined whether the search input data of the selected application program matches any previous search input data. If the inquiry to decision step 340 is positive, then the "yes" branch is followed to step 345 in which the search output data between separate application programs is shared. If the inquiry to decision step 340 is negative, then the "no" branch is followed to step 350 in which a search is conducted in the selected application program. Subsequently, in step 355, the search output data derived from either the search or the shared search output data is displayed. In decision step 360, it is determined whether another application program has been selected to conduct the search. If the inquiry to decision step 360 is positive, then the "yes" branch is followed to step 340 in which it is determined whether the search input data of the selected application program matches any previous search input data. If the inquiry to decision step 360 is negative, then the "no" branch is followed where the process ends.

Figure 3D:
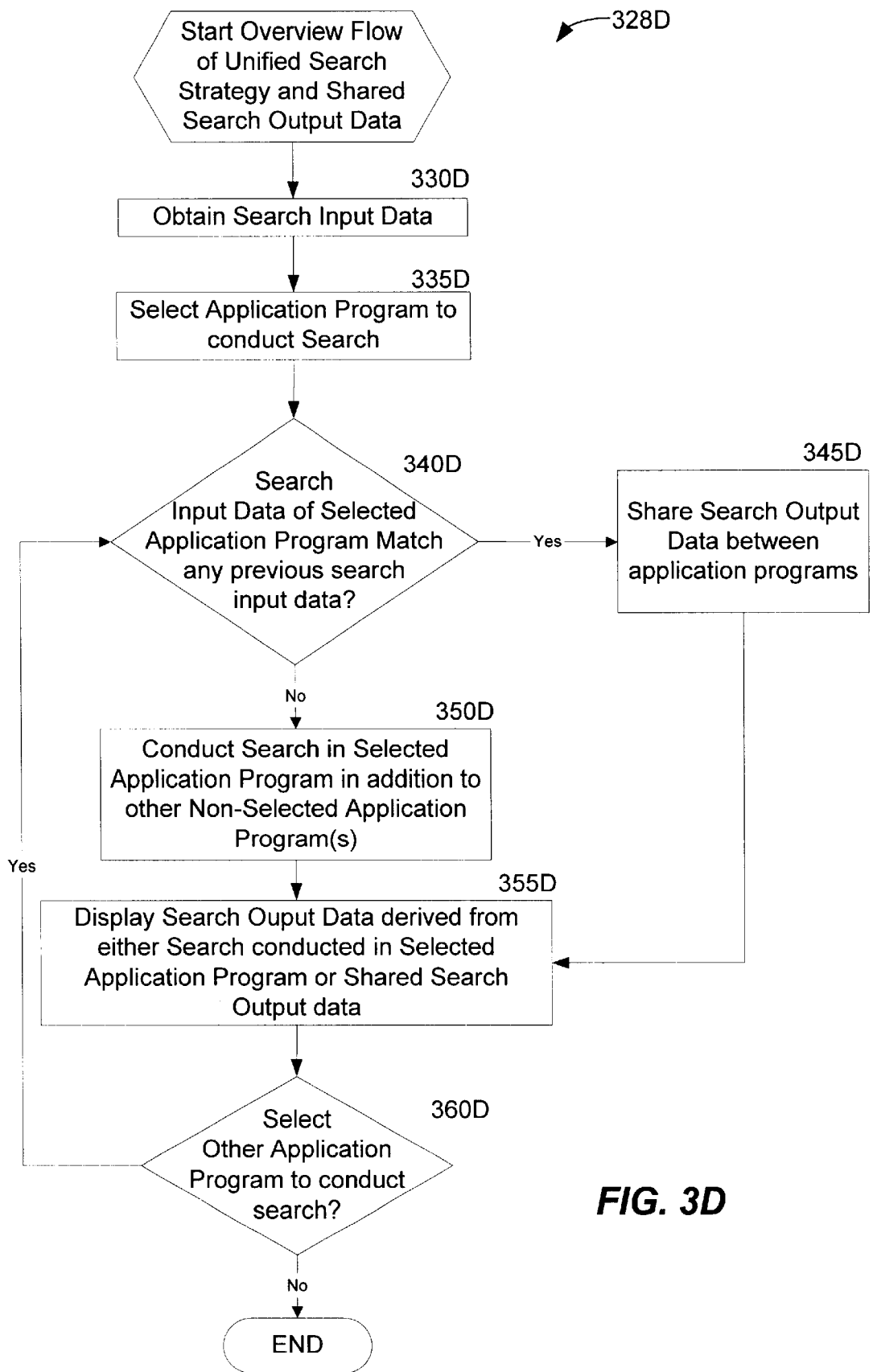
FIG. 3D is another logic flow diagram illustrating an overview of an alternate exemplary process for unifying search strategy and sharing search output results between separate application programs.

FIG. 3D is another exemplary logic flow diagram illustrating an overview of an alternate computer implemented process for unifying search strategy and sharing search output results between separate application programs. FIG. 3D provides an overview of the entire process 328D where step 330D is the first step of the process 328D. In step 330D, search input data can be obtained such as search terms entered into a search engine field 310D as illustrated in FIG. 3A. Next, an application program such as the text application program 314D, graphics application program 316D, or audio application program 318D is selected to conduct the search. In decision step 340D, it is determined whether the search input data of the selected application program matches any previous search input data. If the inquiry to decision step 340D is positive, then the "yes" branch is followed to step 345D in which the search output data between separate application programs is shared.

If the inquiry to decision step 340D is negative, then the "no" branch is followed to step 350D in which a search is conducted in the selected application program in addition to other application programs that are not selected by the user. In other words, unlike the process described with respect to FIG. 3C, in step 350D, a search is conducted in each non-selected application as well as the selected application program but the results of these searches conducted in the non-selected application programs are not displayed. Essentially, steps 340D, 345D, and 350D occur automatically for each non-selected application program, generating results for a later display. This non-selected application program searching happens asynchronously which means that the user can interact with the application while each of these "background searches" continues in parallel. Subsequently, in step 355D, the search output data derived from either the search within the selected application or the shared search output data is displayed. In decision step 360D, it is determined whether another application program has been selected to conduct the search. If the inquiry to decision step 360D is positive, then the "yes" branch is followed to step 340D in which it is determined whether the search input data of the selected application program matches any previous search input data. If the inquiry to decision step 360D is negative, then the "no" branch is followed where the process ends.

Figure 4:
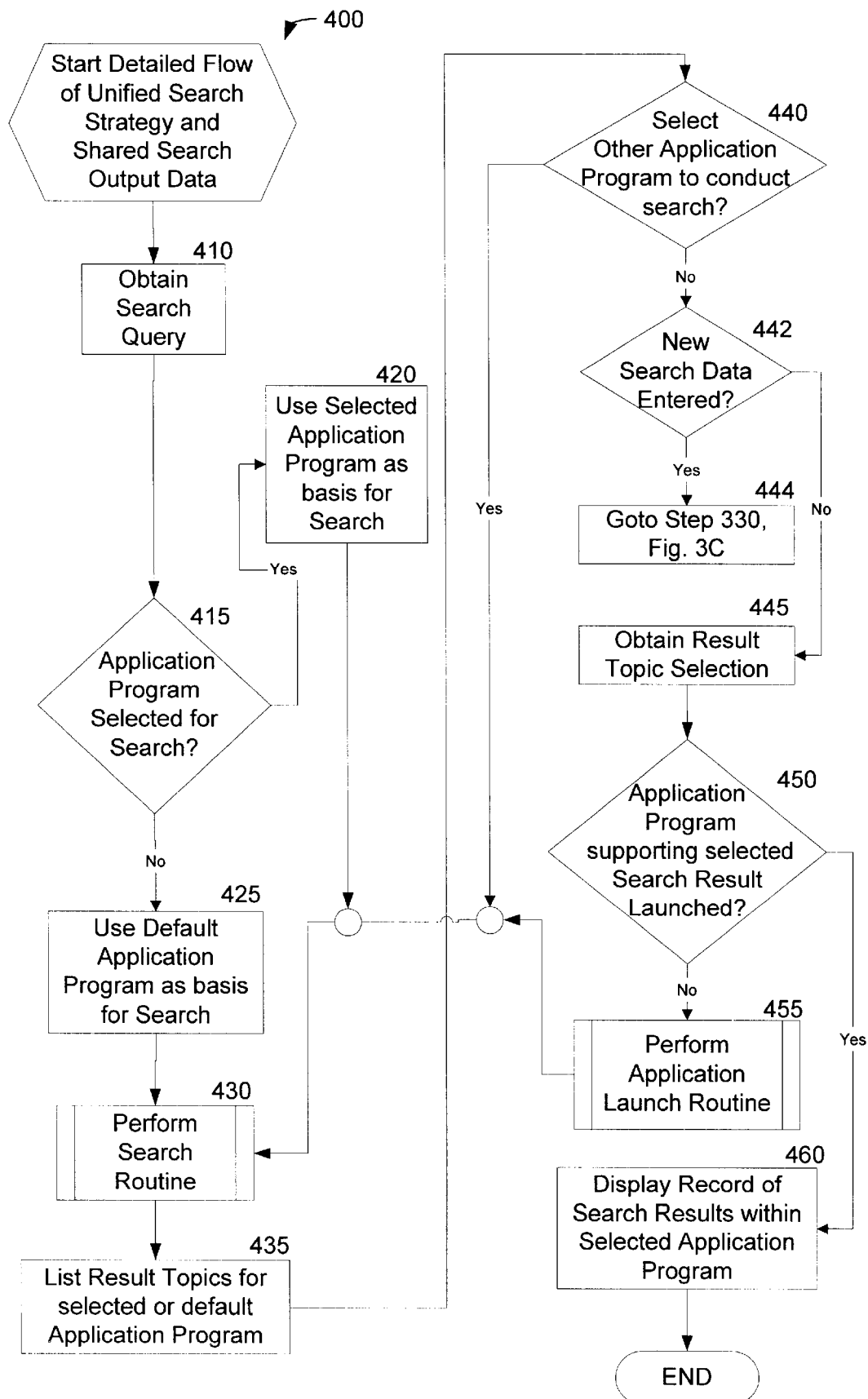
FIG. 4 is a logic flow diagram illustrating a detailed exemplary process for unifying search strategy and sharing search output results between separate application programs.

FIG. 4 is a more detailed exemplary logic flow diagram of a computer-implemented process for unifying search strategy and sharing search output data across multiple application programs. FIG. 4 provides a detailed overview of the entire process where step 410 is the first step of the search unifying process 400. In step 410, a search query is obtained such as the search data entered into the search engine field 310 as illustrated in FIG. 3A. In decision step 415, it is determined whether an application program has been selected for a search. In other words, it is determined which application program will be used to conduct the search as illustrated in the application program selection field 312 of FIG. 3A. Any one of the application programs listed in the application program selection field 312 can be used to conduct a search. As noted above, one or more application programs can be part of the unified search system 200. In the exemplary embodiment, only one application program is usually permitted to be selected as the basis for a search. However, it is not beyond the scope of the present invention that more than one application program could be selected as the basis for the search. In other words, a text and graphics application program such as text application program 314 and graphics application program 316 could be selected simultaneously as the basis for a search. Alternatively, all three could be selected for the basis of a search. It is noted that the application program selected for the search does not have to be launched or the active window. In other words, an application program not currently in use can be searched in accordance with the present invention.

Subsequently, if the inquiry to decision step 415 is positive, then the "yes" branch is followed to step 420 in which the selected application program is used as the basis for the search. If the inquiry to decision step 415 is negative, then the "no" branch is followed to step 425 in which the default application program is used as the basis for the search. Typically, the default application program will correspond to the currently active application program. However, it is not beyond the scope of the present invention to permit the application program vendor to select the default application program or to permit a user to select the default application program in a preferences setup menu. In routine 430, a search is conducted based upon the application program selected for the search as set forth in decision step 415. Next, in step 435, result topics for the selected for default application program are listed in a field such as the search results field 320 and 322 as set forth in FIGS. 3A and 3B, respectively.

In decision step 440, it is determined whether another application program is selected to conduct another search. In other words, if the search results displayed in the search results field 320 or 322 as set forth in FIGS. 3A and 3B are unsatisfactory or if the user really wants to conduct a search in another application program, another application program can simply be selected by activating one of the radio buttons as set forth in the application program selection field 312 of FIGS. 3A and 3B. If the inquiry to decision step 440 is positive, then the "yes" branch is followed back to step 430 in which a search is performed in the selected application program.

If the inquiry to decision step 440 is negative, then the "no" branch is followed to decision step 442. In decision step 442, it is determined whether new search data has been entered into search engine field 310. If the inquiry to decision step 442 is positive, then the "yes" branch is to step 444 in which the process is returned to step 330 of FIG. 3C in which the search input data is obtained. If the inquiry to decision step 442 is negative, then the "no" branch is followed to step 445.

In step 445, a search result topic selection is obtained. In other words, it is determined whether one of the search result topics generated in the search result fields 320 or 322 as set forth in FIGS. 3A and 3B has been selected. Once a search result topic is selected, then in decision step 450, it is determined whether the applications program corresponding or supporting the selected search result has been launched.

If the inquiry to decision step 450 is negative, then the "no" branch is followed to routine 455 in which an application launch routine is performed. If the inquiry to decision step 450 is positive, then the "yes" branch is followed to step 416 in which the record corresponding to the selected search result is displayed within the selected application program.

Figure 5:
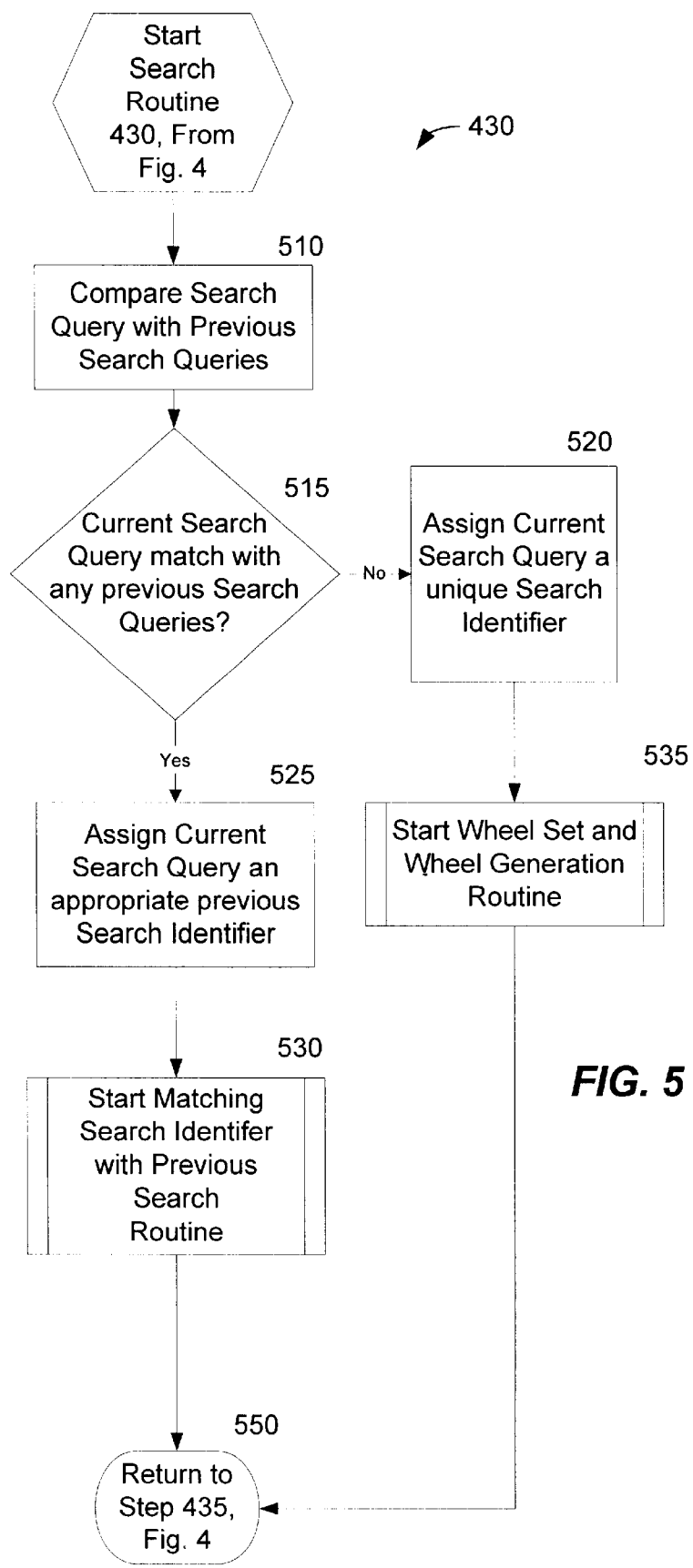
FIG. 5 is a logic flow diagram illustrating an exemplary process for searching across separate application programs.

FIG. 5 illustrates the computer-implemented process for routine 430 of FIG. 4 which conducts the search within the selected application program. Routine 430 begins in step 510 in which the search query data such as the sort search query data entered in the search engine field 310 of either FIG. 3A or 3B is compared with previous search query data. In decision step 515, it is determined whether the current search query data matches any previous search query data. If the inquiry to decision step 515 is positive, then the "yes" branch is followed to step 525 in which the current search query data is assigned an appropriate search identifier of a previous search. In routine 530, the current search identifier is matched with a previous search.

If the inquiry to decision step 515 is negative, then the "no" branch is followed to step 520 in which the current search query data is assigned a unique search identifier. Following step 520, in routine 535, a wheel set and wheel are generated for the newly assigned and unique search identifier. As noted above, a wheel set is defined as a group of wheels where the wheels are search result objects that correspond to each respective application program. In other words, each wheel generates search result data that corresponds to a specific application program as well as a specific search identifier. For example, first wheel 246 of FIG. 2 is contained within wheel set 244 that has a search identifier corresponding to query No. 1 entered in the first application program 210. First wheel 246 uses the first application program 210 as the basis or contents of its search.

Figure 6:
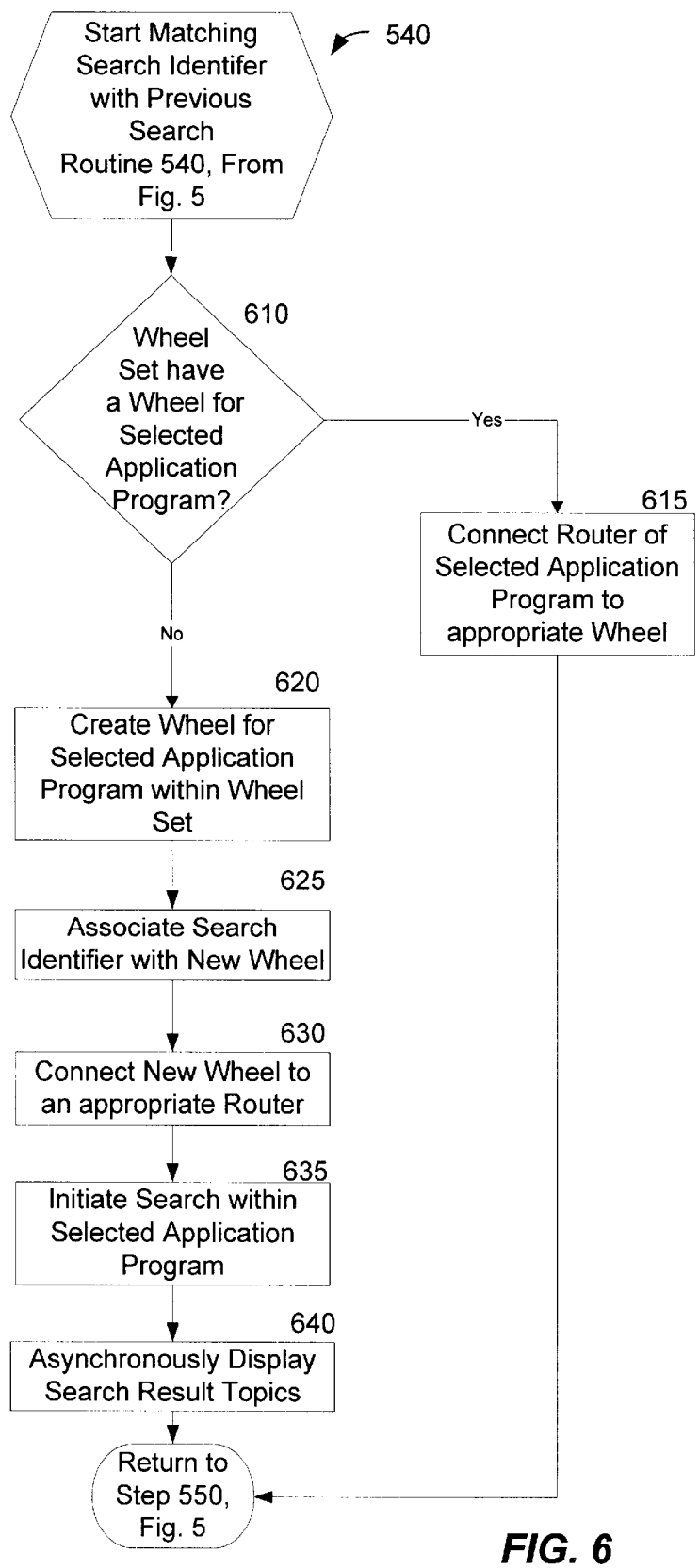
FIG. 6 is a logic flow diagram illustrating an exemplary process for matching a search identifier with a previous search and connecting to previously generated search result objects.

FIG. 6 illustrates the computer-implemented process for routine 530 of FIG. 5 that matches the current search identifier of a search query with a previous search. Routine 530 begins in decision step 610 in which it is determined whether the wheel set corresponding to the current search identifier has a wheel for the selected application program. If the inquiry to decision step 610 is positive, then the "yes" branch is followed to step 615 in which the router of the selected application program is simply connected to the appropriate wheel of a corresponding wheel set. For example, suppose that in a search scenario query No. 2 is entered into the second application program 214. And further suppose, that search results are produced for each application program while the second application program is active or in use. In other words, the text application program 314, the graphics application program 316, and audio application program 318 are examined to see the respective results displayed in search result field 320 as set forth in FIG. 3A. Next, if the third application program 218 is launched and the identical search query, query No. 2, is entered into the search field 310, while the third application program 218 is active, then the routers 236, 238, and 240 corresponding to the second application program 218 will be simply connected to the wheel set 252 and the respective wheels 254, 256, and 258.

If the inquiry to decision step 610 is negative, then the "no" branch is followed to step 620 in which a wheel for the selected application program within the appropriate wheel set is created. For example, if query No. 1 is entered into the first application program and search results are desired for the second application program 214, it is determined whether a wheel 248 has been generated. If the wheel 248 has not been generated then it is generated according to step 620. Then in step 625, the wheel, such as wheel 248, is associated with the search identifier of the current search query such as query No. 1 entered into the first application program 210. Next, in step 630 the wheel, such as wheel 248, is connected to the appropriate router such as router 226 of FIG. 2. In step 635, a search is initiated within the selected application program. In the exemplary scenario, then the wheel 248 would execute a search for query No. 1 in the second application program 214. Then, search result topics are asynchronously displayed. In other words, the display is updated randomly and frequently with sets of search result topics such as the search result topics illustrated in search result field 320 and 322 as set forth in FIGS. 3A and 3B. The search result topics would be displayed in small groups so that it is unnecessary to wait until a search has been completed in order to select an appropriate search result topic. Next, the process returns to step 50 of FIG. 5.

Figure 7:
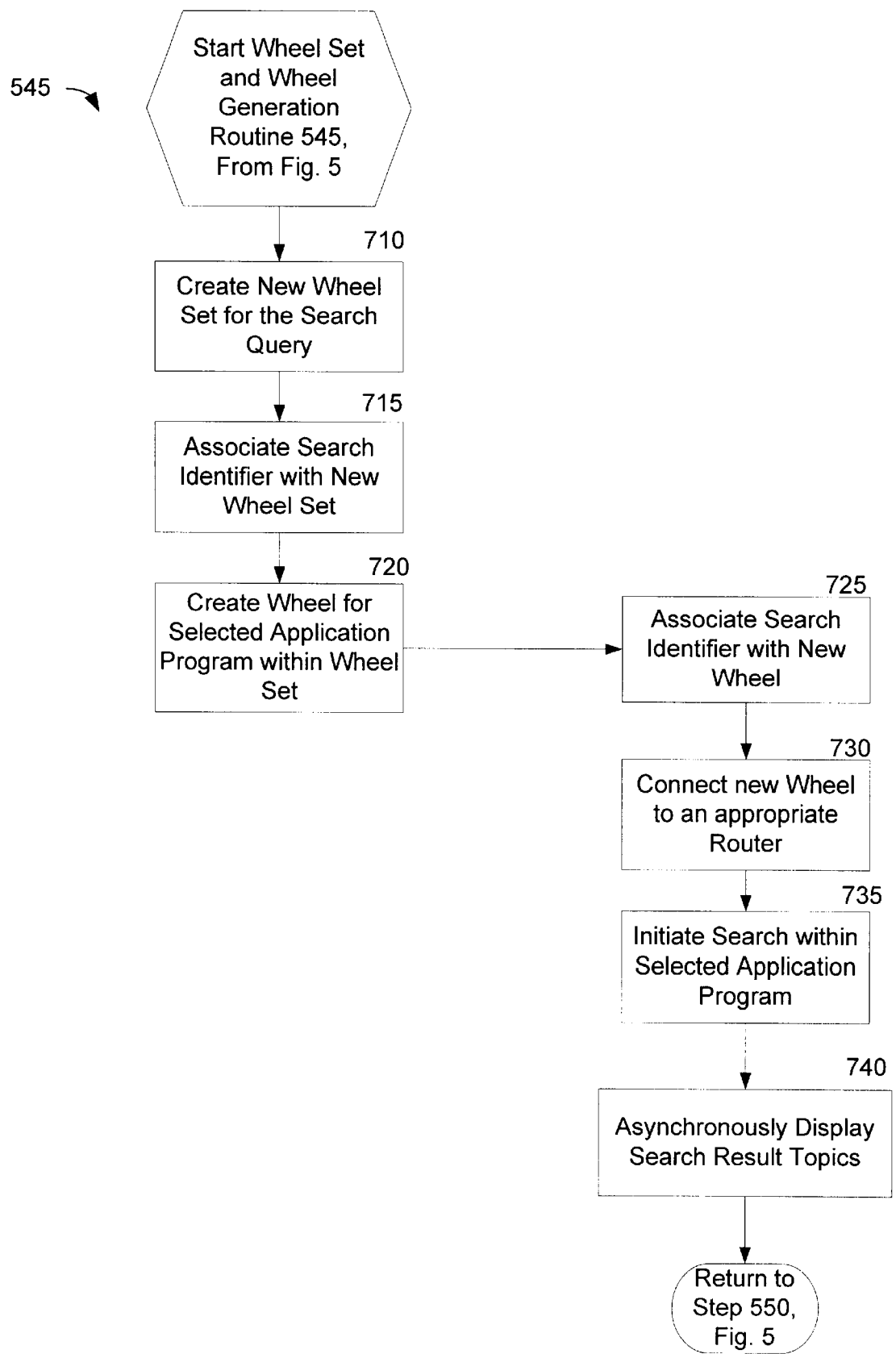
FIG. 7 is a logic flow diagram illustrating an exemplary process for generating search result objects and a search result object set.

FIG. 7 illustrates another exemplary computer-implemented process for routine 535 of FIG. 5. In routine 535, step 710 is the first step where a new wheel set is created for a search query. For example, if query No. 1 is the first query entered into the first application program 210 as set forth in FIG. 2, then the first wheel set 244 will be generated. Next, in step 715, the wheel set, such as the first wheel set 244, would be associated with the search identifier with the appropriate query. In other words, in the hypothetical search scenario, the first wheel set 244 would be associated with the search identifier for query No. 1 entered into the first application program 210.

In step 720, the wheel for the selected application program will be created within the wheel set. In the hypothetical search scenario, this means that one of the wheels 246, 248, or 250 would be generated depending upon which application program was selected as the basis for the search. In step 725, the search identifier for the search query would be associated with the new wheel. Subsequently, in step 730, the new wheel would be connected to an appropriate router. In step 735, a search within the selected application program would then be initiated. In step 740, search result topics will then be asynchronously displayed. In other words, groups of search result topics uncovered during the search process will be displayed while the search process continues. As noted above, the asynchronous display of data allows a search result topic to be selected even though the search process within a selected application program has not terminated. Subsequently, after the search has terminated, the process returns to step 550 of FIG. 5.

Figure 8:
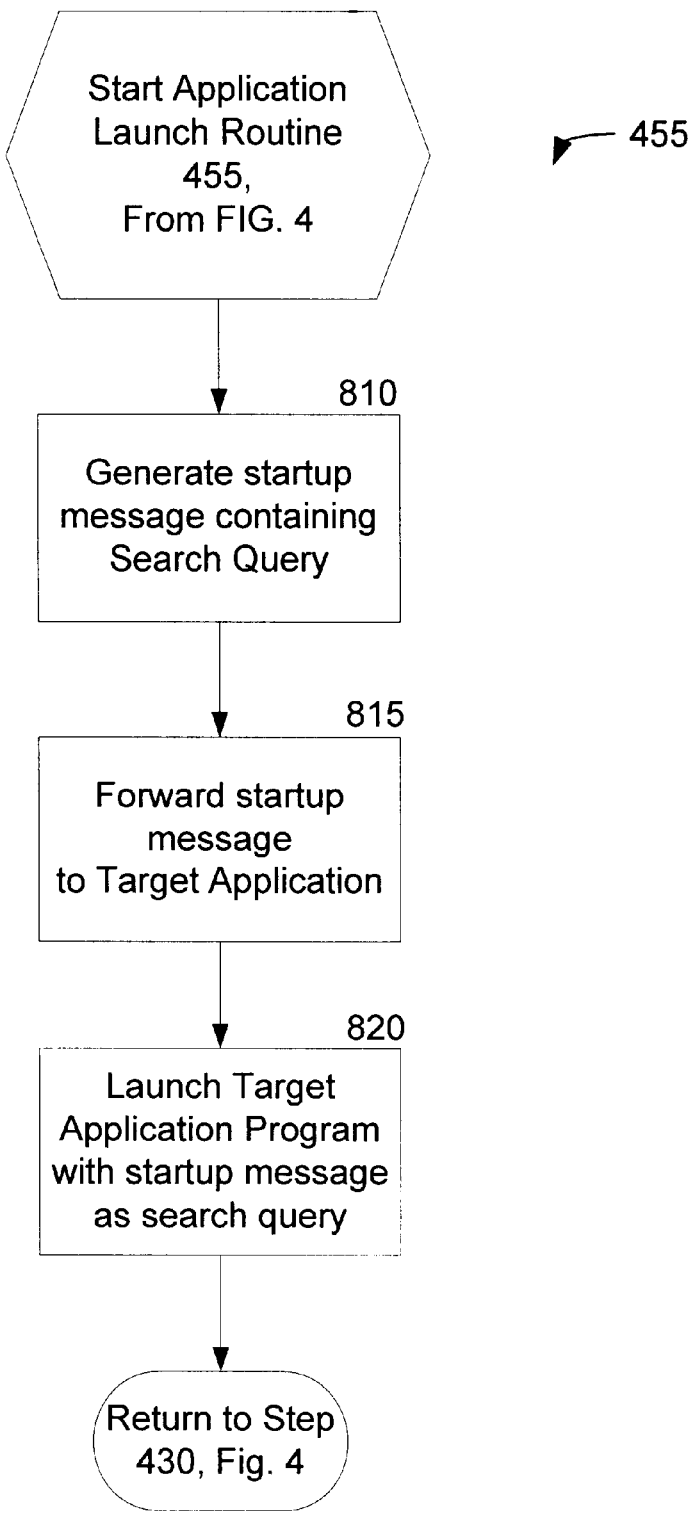
FIG. 8 is a logic flow diagram illustrating an application program launch routine.

FIG. 8 illustrates another exemplary computer-implemented process for routine 455 of FIG. 4. Routine 455 is performed when an application program has not been launched. Step 810 is the first step of routine 455 in which a start-up message containing the current search query is generated. Next, in step 815, the start-up message containing the search query is forwarded to the target application that is to be launched. In step 820, the target application program with the start-up message as the search query is then launched. In other words, routine 455 launches or opens a previously closed application program that may have been used as a basis for a search.

The search engine field 310 as illustrated in FIG. 3A of the appropriate application will be populated with whatever search query had been typed in the originating application program. Such prepopulation of data provides continuity of the search engine from one application to another. In other words, if the phrase "foxes and United States" was inputted into the search engine field 310 while the first application program is providing the user interface control 212, and then a search result listed in the search result field 322 is selected, then the data "foxes and United States" would then be entered into the search engine field 310 of the user interface control 216 of the second application program 214.

The present invention can be designed to search all data content within an application program. For example, if an application program includes web links to web pages on the internet, such links can be included in the material that is searched by the unified search system 200. While the present invention can be employed to search multiple application programs, the invention is not limited to this application and could be used to integrate a search that is conducted over the internet itself. For example, in addition to searching across multiple application programs, the present invention could also be used to conduct an internet based search to uncover any related search result topics. Other applications of the present invention could be to conduct searches across multiple online databases. For example, the present invention could be used for conducting a search across multiple online databases such as legal and technology based data bases, such as Lexis, Dialog, West, and other similar electronic databases.

Thus, with the present invention, multiple programs that are inactive or active can be searched. After a search is conducted, search results can be displayed from programs that are in use and those that are not currently in use when the search is initiated. Upon selection of a search result, the program supporting the selected result can be launched if it is not already in use and can become the active program that is in focus. Once the program supporting the selected result becomes active, the search result can be pre-populated within the search engine of the program. The present invention unifies search strategy by providing a single user interface while facilitating the sharing of search output data across multiple programs. In turn, this sharing of data makes information across multiple separate application programs more readily accessible. The present invention provides a consistent user interface for searching and that eliminates the learning of multiple search techniques that are dependent upon a unique search engine of a respective program.

It should be understood that the foregoing relates only to illustrative embodiments of the present invention, and that numerous changes may be made therein without departing from the spirit and scope of the invention as defined by the following claims.

What is claimed is:

1. A method for unifying search strategy and sharing search output data across multiple programs, comprising the steps of:

obtaining current search input data for a current search in at least one of the multiple programs;

determining whether the current search input data matches any previous search input data for a previous search in any of the multiple programs;

sharing search output data corresponding to the previous search between programs in response to a determination that the current search input data matches any previous search input data;

conducting a search within at least one of the multiple programs in response to determination that the current search input data does not match any previous search input data; and displaying overview search output data derived from one of the shared search output data and the search, whereby re-keying of data is eliminated and processing time is reduced while memory resources are conserved.

2. The method of claim 1, further comprising the steps of:

assigning the current search input data with a previous identifier corresponding to the matching previous search input data, in response to a determination that the current search input data matches any previous search input data; and retrieving previous search output data corresponding to the previous identifier.

3. The method of claim 1, further comprising the steps of:

determining whether another program has been selected after the overview search output data has been displayed; and if another program has been selected, then utilizing the selected program as a basis for a search corresponding to the current search input data and displaying overview search output data.

4. The method of claim 1, further comprising the steps of:

comparing the current search input data with previous search input data;

if the current search input data does not match any previous search input data, then assigning the current search input data a unique search identifier and generating new search output data for the current search input data assigned a unique search identifier;

if the current search input data matches any previous search input data, then assigning the current search input data a previous search identifier corresponding to the matching previous search input data and retrieving corresponding previous search output data for the current search input data assigned a previous search identifier.

5. The method of claim 1, wherein the step of sharing output data further comprises the steps of:
- determining whether a search identifier of the current search input data matches a previous search identifier;
- if a match exists then determining if a search result object set corresponding to the previous search identifier contains an existing search result object corresponding to one of the multiple programs; and
- if an existing search result object exists, then utilizing the existing search result object for search output data.

6. The method of claim 4, further comprising the steps of:
- determining whether an existing search result object exists; and
- if an existing search result object does not exist, then generating a search result object corresponding to the current search input data.

7. The method of claim 4, further comprising the step of, if the search identifier of the current search input data does not match a previous search identifier, then generating a search result object set and a search result object corresponding to the current search input data and one of the multiple programs.

8. The method of claim 6, wherein the step of generating a search result object further comprises the step of associating the search identifier of the current search input data with the generated search result object.

9. The method of claim 7, wherein the step of generating a search result object set and search result object further comprises the step of associating the search identifier of the current search input data with the generated search result object set and search result object.

10. A computer readable medium having computer-executable instructions for performing the steps recited in claim 1.

11. A method for unifying search strategy and sharing search output data across multiple programs, comprising the steps of:
- obtaining current search input data for a current search in at least one of the multiple programs;
- in response to a search request, conducting a first search within one of the multiple programs;
- displaying overview search output data located by the search;
- obtaining a selection of the overview search output data;
- determining whether an output data program supporting the selected overview search output data has been launched;
- in response to a determination that the output data program supporting the selected overview search output data has not been launched, launching the output data program, conducting a second search corresponding to the current search input data within the output data program, and making the output data program active;
- if the output data program has been launched, then making the output data program active; and
- displaying search output data corresponding to the active program, whereby re-keying of data is substantially eliminated and processing time is reduced while memory resources are conserved.

12. The method of claim 11, further comprising the steps of:
- determining whether a program has been selected for a search request;
- if a program has been selected, then utilizing the selected program as a basis for the first search; and
- if a program has not been selected, then utilizing a default program as the basis for the first search.

13. The method of claim 11, further comprising the steps of:
- determining whether another program has been selected after the overview search data has been displayed; and
- if another program has been selected, then utilizing the selected program as a basis for a third search corresponding to the first search and displaying overview search output data for the third search.

14. The method of claim 11, further comprising the steps of:
- if the current search input data matches previous search input data, then assigning the current search input data with a previous identifier; and
- retrieving previous search output data corresponding with the previous identifier.

15. The method of claim 11, further comprising the steps of:
- comparing the current search input data with any previous search input data;
- if the current search input data does not match any previous search input data, then assigning the current search input data a unique search identifier, and generating new search output data for current search input data assigned a unique search identifier; and
- if the current search input data matches any previous search input data, then assigning the current search input data a previous search identifier corresponding to the matching previous search input data, and retrieving previous search output data corresponding with the previous search identifier.

16. The method of claim 11, further comprising the steps of:
- determining whether a search identifier of the current search input data matches a previous search identifier,
- if a match exists then determining if a search result object set corresponding to the previous search identifier contains a search result object corresponding to one of the multiple programs;
- if a search result object exists, then utilizing the search result object for search output data; and
- if a search result object does not exist, then generating a search result object corresponding to the current search input data.

17. The method of claim 16, further comprising the step of:
- if the search identifier of the current search input data does not match a previous search identifier, then generating a search result object set and a search result object corresponding to the current search input data and one of the multiple programs.

18. The method of claim 16, wherein the step of generating a search result object further comprises the step of associating the search identifier of the current search input data with the generated search result object.

19. The method of claim 17, wherein the step of generating a search result object set and search result object further comprises the step of associating the search identifier of the current search input data with the generated search result object set and search result object.

20. The method of claim 11, wherein the step of displaying overview search output data comprises the step of asynchronously displaying the overview search output data while an overview search is being conducted.

21. The method of claim 16, wherein the step of utilizing the search result object for search output data comprises connecting a data access object to a previous corresponding search result object.

22. The method of claim 16, wherein a number of search result objects in a respective search result object set is substantially equal to the number of programs that share output search data.

23. The method of claim 16, wherein each program of the multiple programs has a respective search result object set and each search result object set has a number of search result objects that are substantially equal to the number of programs that share output search data.

24. The method of claim 16, wherein each search result object comprises a common object model object.

25. A computer readable medium having computer-executable instructions for performing the steps recited in claim 11.

26. A computer system with a unified search strategy and shared output data across multiple programs, comprising:
   a processing unit;
   a memory storage device;
   a display device coupled to the processing unit for displaying data; and
   a plurality of programs stored in said memory storage device for providing instructions to said processing unit,
   said processing unit responsive to said instructions of said programs being operable for
      obtaining a selection of program to be used as a basis for a search corresponding to search input data;
      sharing search output data corresponding to a previous search between programs if the search input data matches previous search input data; and
      displaying overview search output data derived from one of shared output data and a search, whereby re-keying of data is substantially eliminated and processing time is substantially reduced while memory resources of the computer system are substantially conserved.

27. The system of claim 26, wherein the processing unit is further operable for determining whether another program has been selected after the overview search output data has been displayed; and if another program has been selected, then utilizing the selected program as a basis for a search corresponding to the search input data and displaying overview search output data.

28. The system of claim 26, wherein the processing unit is further operable for determining whether a search identifier of current search input data matches a previous search identifier, if a match exists then determining if a search result object set corresponding to the previous search identifier contains an existing search result object corresponding to one of the selected program and the default program; and
   if an existing search result object exists, then utilizing the existing search result object for search output data.

29. The system of claim 26, wherein the processing unit is further operable for generating search result objects and search result object sets, and wherein a number of search result objects in a respective search result object set is substantially equal to the number of programs that share output search data.

30. The method of claim 29, wherein each search result object comprises a common object model object.

* * * * *

UNITED STATES PATENT AND TRADEMARK OFFICE
CERTIFICATE OF CORRECTION

PATENT NO. : 6,708,162 B1
DATED : March 16, 2004
INVENTOR(S) : Bruce Morgan

It is certified that error appears in the above-identified patent and that said Letters Patent is hereby corrected as shown below:

Column 13,
Line 45, insert -- first -- before "search".

Column 15,
Line 15, after "model" delete "object".

Column 16,
Line 2, after "shared" insert -- search --.
Line 31, insert -- search -- before "output".
Line 31, after "output" delete "search".
Line 33, after "model" delete "object".

Signed and Sealed this

Ninth Day of August, 2005

JON W. DUDAS
*Director of the United States Patent and Trademark Office*